United States Patent [19]
Tintera et al.

[11] Patent Number: 5,606,392
[45] Date of Patent: Feb. 25, 1997

[54] CAMERA USING CALIBRATED APERTURE SETTINGS FOR EXPOSURE CONTROL

[75] Inventors: Anthony L. Tintera, Rochester; Jean F. Depatie, Albion, both of N.Y.

[73] Assignee: Eastman Kodak Company, Rochester, N.Y.

[21] Appl. No.: 671,835

[22] Filed: Jun. 28, 1996

[51] Int. Cl.$^6$ ............................. G03B 7/00; G03B 15/05
[52] U.S. Cl. .................. 396/161; 348/362; 348/371; 396/236
[58] Field of Search ..................... 348/362, 363, 348/364, 365, 366, 367, 368, 229, 230, 297, 298, 299, 370, 371; 354/412, 456, 458, 441–445, 435, 436, 437, 439, 440, 416, 417

[56] References Cited

U.S. PATENT DOCUMENTS

| | | | |
|---|---|---|---|
| 4,210,394 | 7/1980 | Sato et al. | 354/234 |
| 4,400,072 | 8/1983 | Suzuki et al. | 354/43 |
| 4,423,934 | 1/1984 | Lambeth et al. | 354/412 |
| 4,737,814 | 4/1988 | Nakajima | 354/412 |
| 4,881,094 | 11/1989 | Terui et al. | 354/286 |
| 4,916,477 | 4/1990 | Date | 354/436 |
| 5,371,691 | 12/1994 | Seki et al. | 354/416 X |

FOREIGN PATENT DOCUMENTS

0443463A1  2/1991  European Pat. Off. ........ G03B 17/14

*Primary Examiner*—W. B. Perkey
*Attorney, Agent, or Firm*—David M. Woods

[57] ABSTRACT

A camera includes a mechanically-controlled aperture mechanism providing two or more aperture sizes for regulation of the intensity of image light gathered by the camera, a storage device for storing aperture calibration data corresponding to the measured transmissivity of each aperture size, and means for controlling camera exposure according to the value of one or more exposure parameters other than the aperture. The exposure errors caused by the aperture mechanism are thereupon compensated for with an exposure circuit that utilizes the stored aperture calibration data in order to establish the value of at least one of the exposure parameters other than the aperture. Such other exposure parameters include the shutter time and quench time for a flash, and in the case of an electronic camera the gain applied to the captured image signal.

18 Claims, 5 Drawing Sheets

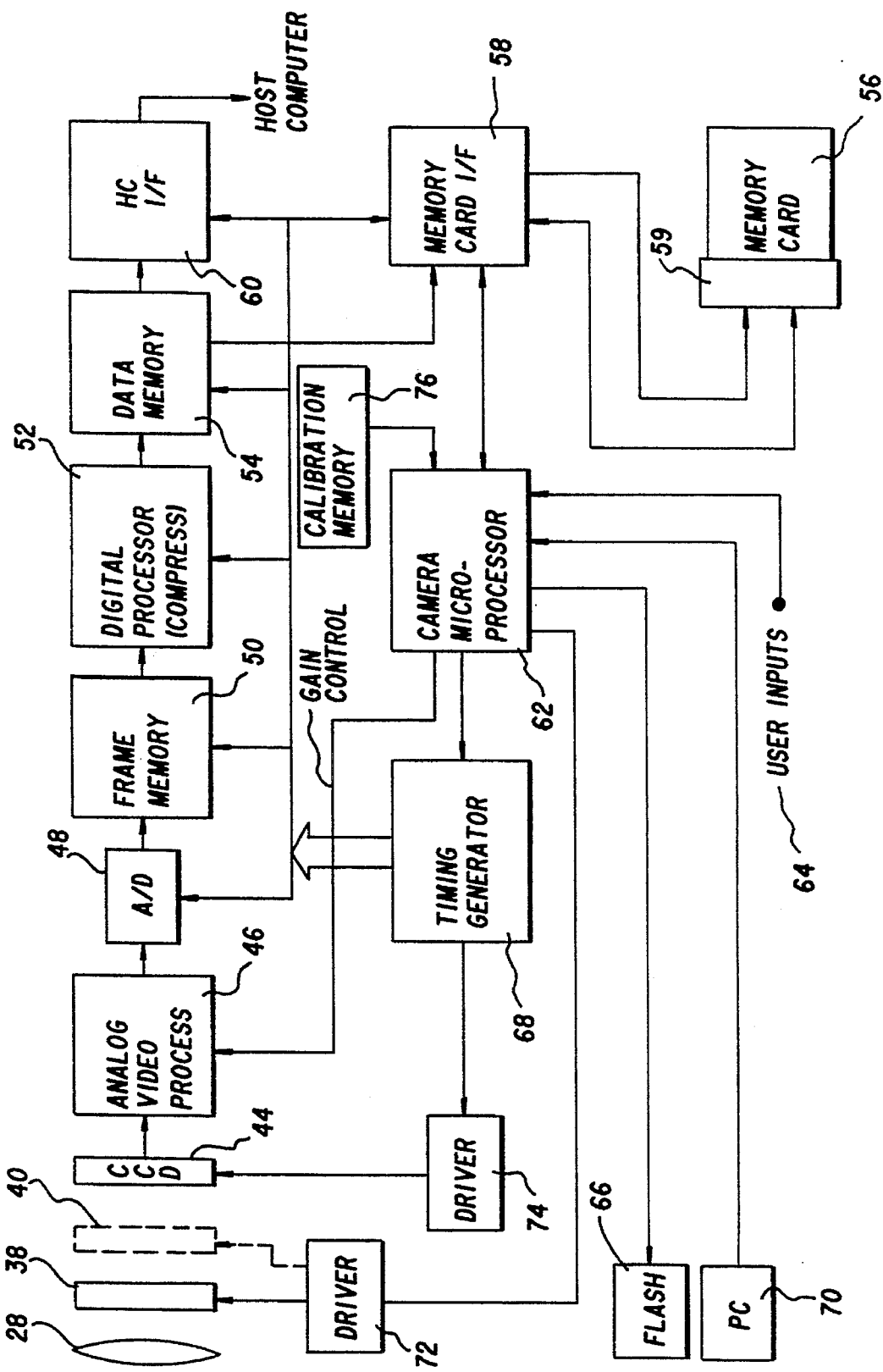

CAMERA USING CALIBRATED APERTURE SETTINGS FOR EXPOSURE CONTROL

FIELD OF THE INVENTION

The invention relates generally to the field of photography, and in particular to apparatus and method for exposure control of photographic cameras.

BACKGROUND OF THE INVENTION

In both electronic and film cameras, the determination of ambient exposure level is used to select appropriate light-gathering parameters, such as aperture size and shutter time, to properly expose the light-gathering image receptor, whether it is an electronic sensor or a photographic film. Such parameters are controlled by a variety of aperture and shutter mechanisms. One type of aperture mechanism used to limit the amount of light allowed to pass through a camera lens allows fixed steps of control, with each step of control allowing a predetermined percentage of light (compared to full aperture) to pass through the lens and onto the image receptor.

An aperture mechanism with fixed aperture stops is often a multiple-bladed iris with blades that move to block light from entering a fixed aperture opening in the assembly. As shown in the exploded view in FIG. 1, a typical aperture mechanism 8 of this type includes a set of aperture blades 10 supported for movement within a housing 12 between upper and lower separators 14 and 16. An actuator 20 is connected by pins 20a through slots 14a, 16a in the separators 14 and 16 to the blades 10. This aperture assembly is fastened into the housing 12 by a retainer 18. A rack gear 20b on the actuator 20 mates with a pinion gear 22 on a drive motor 24, which in turn is driven by an aperture controller 26 to several fixed positions. In operation, the drive motor 24 rotates the actuator 20 to regulate the opening defined by the position of the blades 10. By closing completely, as shown in FIG. 1, this aperture mechanism can also provide a shuttering function (for which reason it is sometimes referred to as an aperture/shutter mechanism).

As further shown in FIG. 1, a lens 28 directs image light along an optical path 29 through the aperture mechanism 8 toward a photo receptor, in this case a photographic film 30. The film 30 is supported by a transport mechanism 32 such that a section thereof is presented in an image plane 34 of the optical section (the lens 28 plus the aperture mechanism 8). The aperture blades 10 thus regulate the intensity of the light that is allowed to strike the image plane 34. While shown as three separate movable aperture blades 10a, 10b, and 10c, an aperture mechanism may utilize more or fewer blades. For example, some conventional camcorders utilize one blade that moves with respect to a stationary stop. FIG. 2 shows the central parts of the three blades 10a, 10b, and 10c overlap to generate an aperture opening 11.

As further shown in FIG. 2, the blades 10 can move to multiple "stop positions" which allow more or less light to enter the camera. For example, the controller 26 commands the aperture position to change from stop A (FIG. 2A) to stop B (FIG. 2B). This movement enlarges the aperture opening 11 between the blades, while a movement from stop C (FIG. 2C) to stop B (FIG. 2B) closes the aperture opening 11. In each case the final designated aperture used for capture is nominally identical, yet the actual amount of light passing through the opening 11 in each case is different. This is due to backlash in the gears connecting the motor 24 to the blades 10a, 10b, 10c, or to friction in the assembly which acts to prevent the blades from reaching their intended destination, or to lack of friction which causes overshoot from the intended movement direction. Also, aperture openings may deviate from one another because of size and/or alignment differences of individual blades which comprise the aperture assembly.

Film cameras which utilize aperture mechanisms with fixed stop positions normally constrain the tolerance of the aperture assembly in order to limit the exposure errors which occur at capture. This is often difficult as aperture assemblies exhibit a variety of variation due to mechanical size, friction and electrical drive momentum considerations. This also tends to make the final cost of the aperture assembly more expensive due to the elimination of apertures which are outside the tighter specification. Because these cameras do not attempt to correct the individual aperture assembly response, the final capture exposure often varies as much as ±½ stop.

Digital cameras which use bladed apertures also exhibit capture exposure error due to the error in moving to a specific aperture position. Often this error is quite different depending whether the aperture/shutter mechanism is opening or closing as a result of backlash and friction. Due to this problem, these aperture/shutter mechanisms must usually be produced with tight tolerances to yield acceptable exposure error, which can be quite expensive. Moreover, repetitive camera exposures can oscillate if viewed upon a real-time monitoring device such as a preview liquid crystal device (LCD), causing extra wear on the aperture mechanism and unpleasant viewing feedback to the camera user.

Since the problem presented by variations in aperture blade movement results in exposure variation, the challenge is to anticipate these exposure variations and to compensate for the resultant exposure errors.

SUMMARY OF THE INVENTION

The present invention is directed to overcoming one or more of the problems set forth above. Briefly summarized, according to one aspect of the present invention, a camera includes an aperture mechanism providing two or more aperture sizes for regulation of the intensity of image light gathered by the camera, a storage device for storing aperture calibration data corresponding to the measured transmissivity of each aperture size, and means for controlling camera exposure according to the value of one or more exposure parameters other than the aperture. The exposure errors caused by the aperture mechanism are thereupon compensated for with an exposure circuit that utilizes the stored aperture calibration data in order to establish the value of at least one of the exposure parameters other than the aperture. Such other exposure parameters may include, e.g., the shutter time and quench control, or flash charge control, for a flash, and in the case of an electronic camera the gain applied to the captured image signal.

By storing directional or non-directional calibration information pertaining to the actual light gathering of each aperture step in camera production, and using this data to anticipate exposure errors when changing aperture positions, the capture exposures which occur before still capture (in a digital system) and/or the final still capture are improved. The improvement in exposure accuracy can reduce aperture oscillation during image composition, thereby acting to reduce wear on the aperture/shutter subsystem. In addition, the mechanical tolerances can be looser, causing the aperture/shutter mechanisms to be cheaper to produce, without affecting the exposure performance of the camera.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3 is a block diagram of an electronic camera incorporating calibrated aperture settings for exposure control according to the invention;

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
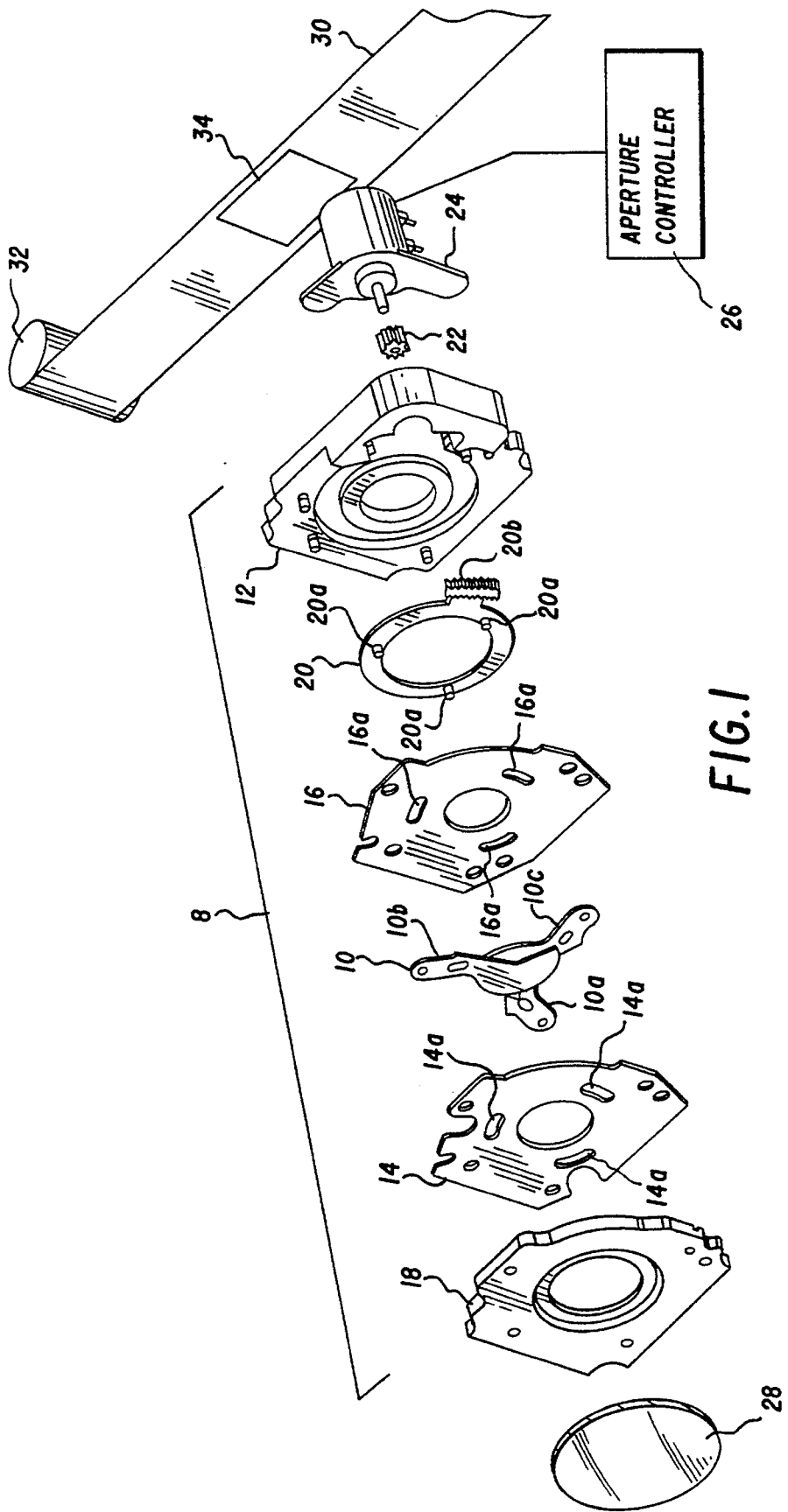
FIG. 1 is a diagram of a film camera showing an exploded view of an aperture mechanism of the type that can be used with the invention.
Figures 2A, 2B, 2C:
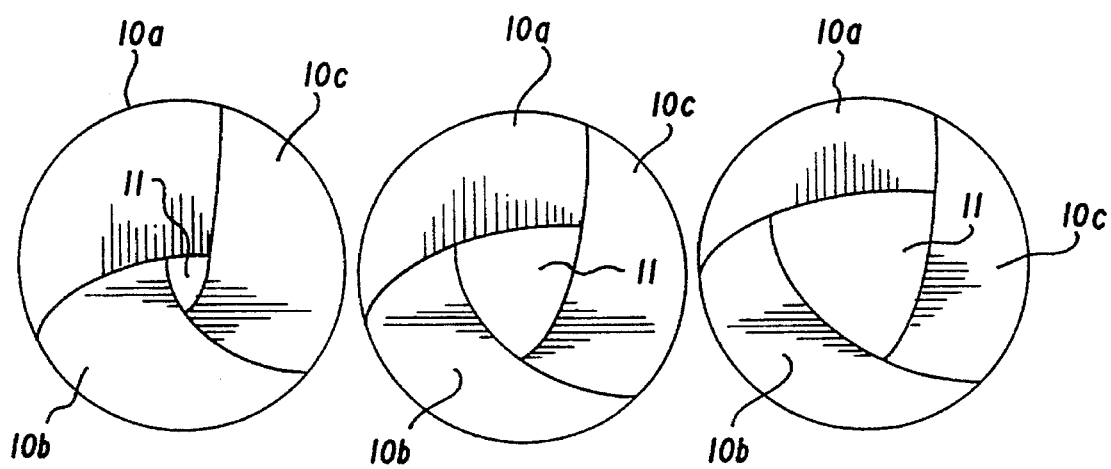
FIGS. 2A, 2B, and 2C are diagrams of different aperture openings provided by different positions of aperture blades included in the aperture mechanism shown in FIG. 1.

If the aperture mechanism shown in FIG. 1 is calibrated during production of the entire camera (or during production of just the aperture mechanism) by determining the amount of light (numerically) that passes through each aperture mechanism at each aperture step in either of the control directions (i.e., when moved to the designated aperture from larger or smaller apertures), the resultant data can be used to improve the exposures subsequently obtained by the camera. During this calibration step, a table of calibration values are generated that represent transmittance variation relative to nominal values on the output side of the aperture mechanism as the aperture positions are changed. Typically the imaging sensor is used as the sensing means during the calibration step (for an electronic camera), although a separate photometer can be employed at the image plane.

These calibration values are compared to the expected deviation from each step to another step relative to the nominal condition. Any deviation from the nominal assumption is error, and can be stored in a camera calibration memory as deviations from nominal. As to the format of this data, it could be stored in absolute quantities representing f-number, exposure values, equivalent diameter (of the aperture) or linear energy, but most likely would be stored in terms of deviation from nominal to reduce storage requirements. If the data is stored in terms of deviation from nominal, the most likely storage would be as stops deviation (EV) or equivalent diameter, which are more linear with regard to perceived exposure variation.

While the invention may be practiced with a film or an electronic camera, the following description will be in terms of an electronic camera. More particularly, FIG. 3 is a block diagram of a camera incorporating calibrated aperture settings according to the invention. A lens 28, which directs image light from a subject (not shown) through an aperture mechanism 38 upon an image sensor, which is preferably a charge coupled device (CCD) sensor 44. Shuttering can be performed mechanically (as is typical with a full frame sensor or with a film camera), either by the aperture mechanism such as shown in FIG. 1 (aperture/shutter mechanism) or by a separate shutter mechanism 40 (shown in broken line). Alternatively, shuttering can be performed electronically by appropriate clocking of the sensor 44 (as would be typical for an interline sensor). The sensor 44 generates an image signal that is processed by an analog video processor 46 before being converted into a digital image signal by an analog to digital (A/D) converter 48. For example, the processor 46 adjusts the gain of the output image signals according to exposure conditions. The digitized image signal is temporarily stored in a frame memory 50, and then compressed by a digital signal processor 52. The compressed image signal is then stored in a data memory 54 and, if a removable memory card 56 is connected, transferred through a memory card interface 58 to the memory card 56. The memory card interface would typically receive a card adapted to the PCMCIA card interface standard, such as described in the PC Card Standard, Release 2.0, published by the Personal Computer Memory Card International Association, Sunnyvale, Calif., September, 1991.

Electrical connection between the memory card 56 and the camera 36 is maintained through a card connector 59 positioned in a memory card slot (not shown). The card interface 58 and the card connector 59 provide, e.g., an interface according to the aforementioned PCMCIA card interface standard. The compressed image signal may also be sent to a host computer connected to the camera through a host computer interface 60. A camera microprocessor 62 receives user inputs 64, such as from a shutter release, and initiates a capture sequence by triggering a quenchable flash unit 66 (if needed) and signaling a timing generator 68. The microprocessor 62 also provides a gain adjustment signal to the analog video processor 46 and a quench or charge control of the flash 66. (While the gain adjustment has been shown to be an analog adjustment, the gain adjustment could be a digital adjustment applied to the digital signal after A/D conversion.) The timing generator 68 is connected generally to the elements of the camera, as shown in FIG. 3, for controlling the digital conversion, compression, and storage of the image signal.

Figure 5:
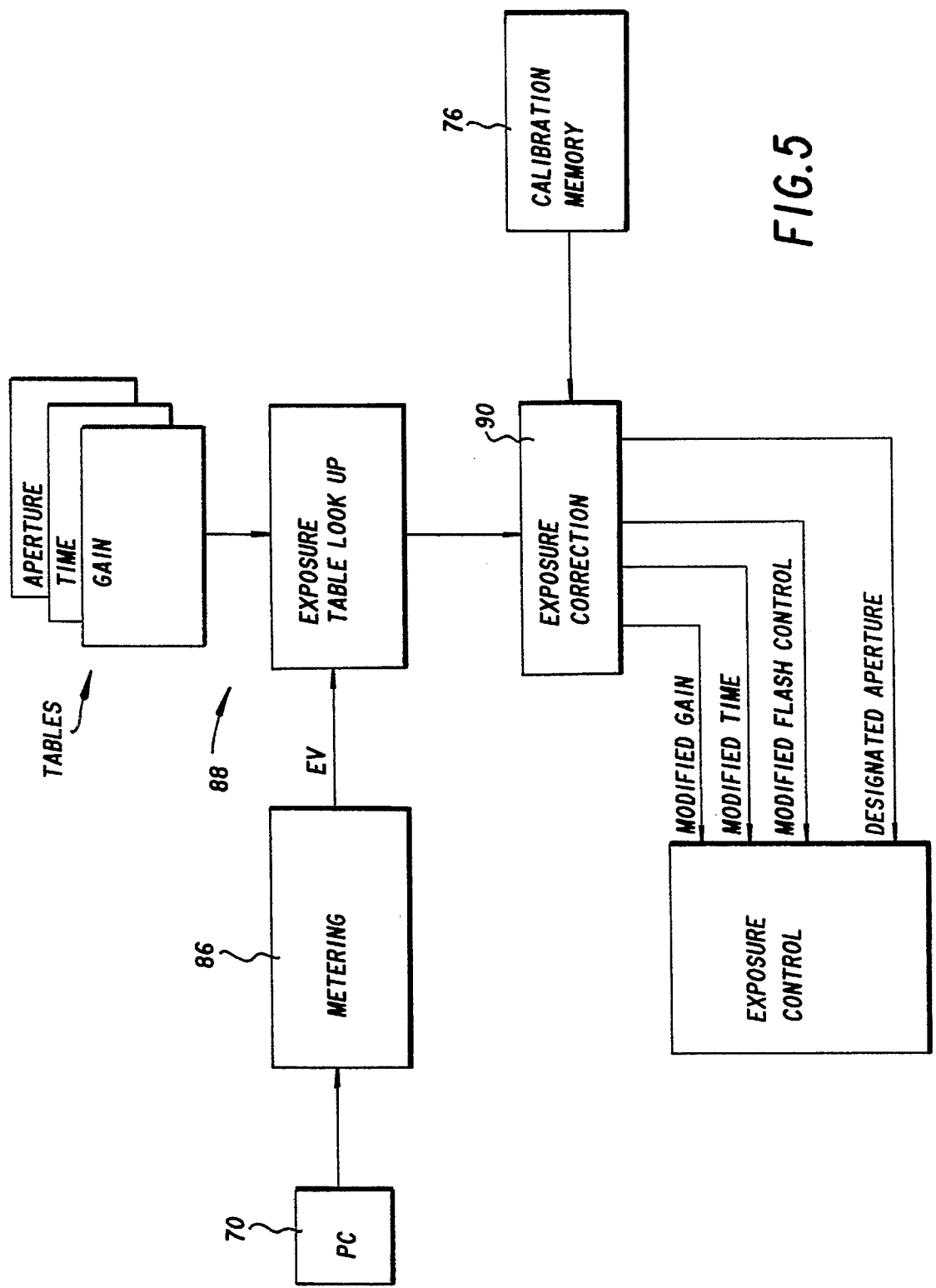
FIG. 5 is a block diagram showing a technique for adjusting exposure parameters based on calibration data corresponding to different calibrated aperture settings.

The microprocessor 62 also processes a signal from a photodiode 70 for determining a proper exposure (alternatively, the image signal from the CCD sensor 44 could be used). In particular, the microprocessor 62 evaluates image light received by the photodiode 70 (or captured by the CCD image sensor 44) to determine the evaluated light level of the scene. As shown in FIG. 5, this light level is used in a conventional manner in the microprocessor 62 by a metering control section 86 to index into an exposure program table 88 to generate a designated aperture, gain and exposure time to use for this light level, assuming the aperture is nominal. The microprocessor is also connected to an exposure driver 72 for setting the aperture via the aperture mechanism 38. The shutter speed may be set via an aperture mechanism 38 of the type shown in FIG. 1, or by a separate shutter mechanism 40, or by driving the CCD sensor 44 from the timing generator 68 via a sensor driver 74 to perform electronic shuttering. The sensor driver 72 also applies clock signals to the CCD sensor 44 in order to produce the image signal.

A set of calibration values are stored in the calibration memory 76 representative of transmittance variations of the aperture mechanism as the aperture positions are changed. Preferably, two values are stored for each designated aperture size, one for the transmittance variation due to movement of the aperture blades from a smaller aperture size up to a designated aperture size, and the other for the transmittance variation due to movement of the aperture blades from a larger aperture size down to a designated aperture size. The calibration memory 76 is connected to the camera microprocessor 62 so that, as shown in FIG. 5, for each designated aperture size another exposure parameter can be adjusted in an exposure correction section 90 to compensate for the transmittance variation due to the aperture blade movement. In an electronic camera, such other exposure parameters include the shutter time, the analog gain value applied to the analog video processor 46, and (if a flash is used) the quench or flash charge control applied to the flash 66. Accordingly, the exposure correction section 90 includes correction logic for processing the known aperture deviation obtained from the memory 76, which pertains to moving to the aperture suggested by the exposure program table from the required movement direction. The correction logic determines a particular combination of gain and shutter time which corrects for the anticipated exposure error due to the capture aperture having the known calibration exposure error, also taking into account any quantization in terms of time or gain control.

In an electronic camera, images are often captured in a precapture space for autofocus, autoexposure, and framing. Because this technique allows any capture exposure to be improved, in the case of pre-still captures used for exposure/focus/white-balance processing, this technique reduces the possibility that the aperture could oscillate between two positions due to unanticipated exposure errors. For instance, if the first capture is slightly dark and the exposure control decides to modify the aperture to the next larger aperture using the nominal assumption only, if the real aperture is larger than anticipated due to directional backlash, the next capture will yield an image that is too bright. The exposure control might then move back to the smaller aperture. It is thus possible without calibration that the exposure control could continue to change apertures yielding erratic performance, particularly if viewed on an active display such as an LCD.

Figure 4:
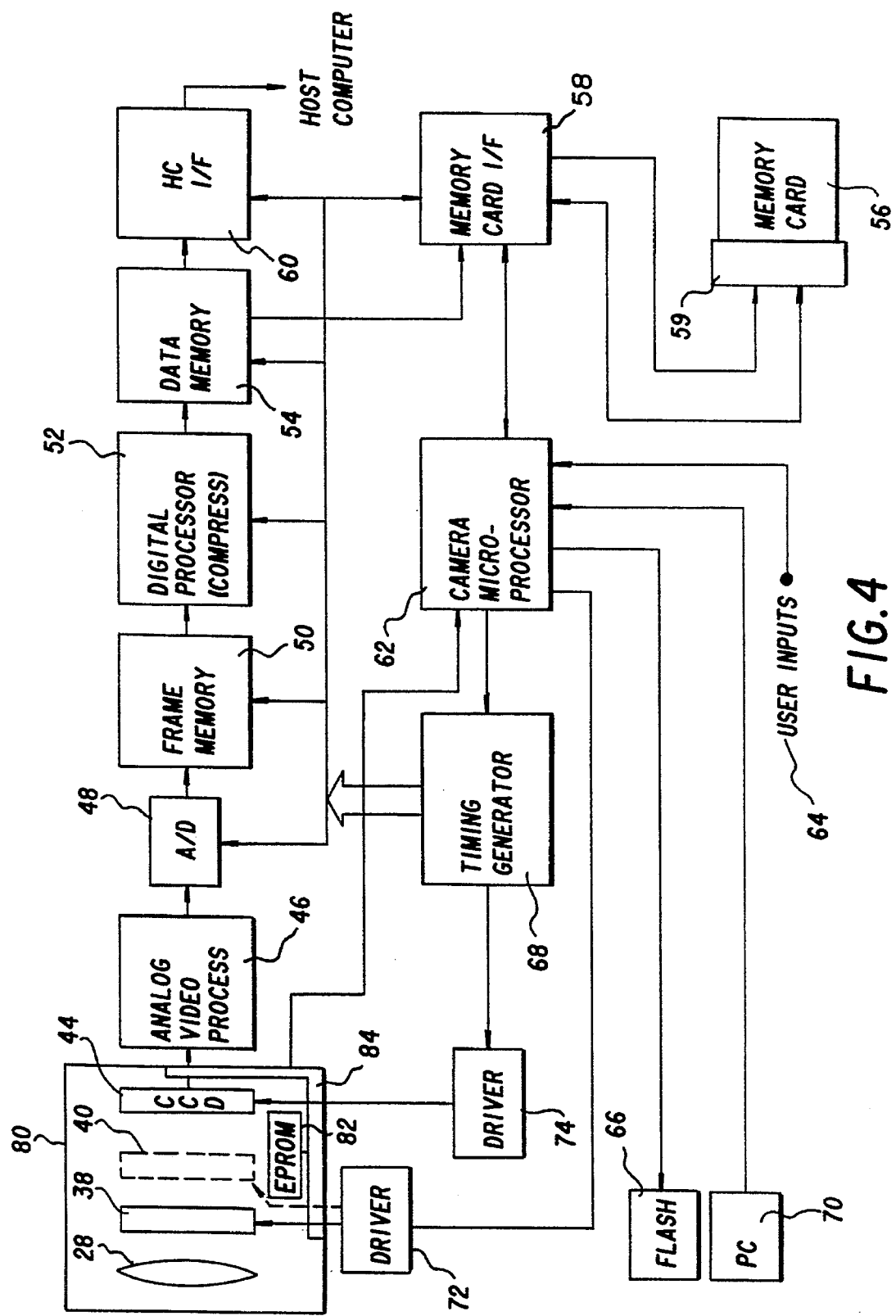
FIG. 4 is a block diagram of another embodiment of an electronic camera incorporating calibrated aperture settings in which the calibration data is incorporated into an optical subassembly.

The ultimate optical performance of an electronic camera is directly influenced by the various optical components which comprise the image capture path. It is possible to maximize the exposure accuracy of a particular camera by computing a unique aperture correction table for that camera which compensates for the unique optical characteristic of that camera. This approach also minimizes the variation in exposure reproduction from one camera to the next. With reference to FIG. 4, a simplified block diagram illustrating the preferred embodiment of the invention is shown. The electronic camera has an optical subassembly 80 containing the lens 28, the aperture mechanism 38, the CCD sensor 44, and a calibration memory in the form of an EEPROM 82. (Although not shown, the subassembly could also include an infrared cutoff filter and a blur filter. The CCD imager 44 would also have an integral color filter array (CFA).) The optical subassembly 80 has predetermined aperture characteristics due to the aperture mechanism 38, which uniquely distinguishes this imaging device from other imaging devices of the same type. These characteristics are stored in the EEPROM 82, which is connected to the camera microprocessor 62 through an electrical connecting means 84. In other words, although different cameras 10 contain nominally identical optical elements, including sensors, their overall aperture responses will differ from camera to camera.

The optical subassembly 80, which is used to capture an image of a scene, is designed to be removable from the camera for purposes of servicing and calibration. When installed in the camera, the optical subassembly electrically connects to the analog video processing section 46, the drivers 72 and 74, and the microprocessor 62 through an electrical connecting means 82. Image-wise signals from the CCD sensor 44 are converted to digital, linear RGB format within the camera by using techniques and components familiar to those skilled in the art. These digital RGB signals represent the red, green and blue primary components of the image, respectively. In addition to gain control, the analog processing section 46 may perform such well-known tasks as double-correlated sampling of the CCD signals, black-level control, white-balance, analog-to-digital conversion, conversion of the CCD signals to RGB and interpolation of the CFA data to produce RGB values at each pixel location.

Aperture calibration information is generated by imaging a uniform light source through the aperture mechanism 8 onto either the camera CCD sensor 44 or a radiometer (not shown). Beginning, e.g., with the largest aperture value, the exposure time and gain are set by the camera microprocessor 62 to yield a nominal "energy" reading in terms of an A/D code value or a radiometer reading. This gives the nominal transmittance for that particular aperture, and the corresponding nominal transmittances for the other apertures can be calculated. Image captures are then sequentially performed as the aperture is stepped from its largest value to its smallest value, and again from the smallest value to the largest value. Knowing the expected nominal transmittance for each aperture step, the exposure time or gain (in the case of using the camera as the energy sensing device) are varied to keep the "energy" reading within a practical range. The measured deviation from nominal is determined by comparing the actual "energy" reading with the "energy" reading which would have been obtained if the aperture was truly nominal. This energy difference is then converted into an appropriate storage format and stored in the calibration memory 76 (FIG. 3) or the EEPROM 82 (FIG. 4).

The invention has been described with reference to a preferred embodiment. However, it will be appreciated that variations and modifications can be effected by a person of ordinary skill in the art without departing from the scope of the invention.

PARTS LIST

| | |
|---|---|
| 8 | aperture mechanism |
| 10 | aperture blades |
| 10a,b,c | movable blades |
| 11 | opening |
| 12 | housing |
| 14 | upper separator |
| 14a | slot |
| 16 | lower separator |
| 16a | slot |
| 18 | retainer |
| 20 | actuator |
| 20a | pins |

-continued

| | |
|---|---|
| 20b | rack gear |
| 22 | pinion gear |
| 24 | drive motor |
| 26 | aperture controller |
| 28 | lens |
| 30 | film |
| 32 | transport mechanism |
| 34 | image plane |
| 36 | camera |
| 38 | aperture mechanism |
| 40 | shutter mechanism |
| 44 | CCD sensor |
| 46 | analog video processor |
| 48 | A/D converter |
| 50 | frame memory |
| 52 | DSP |
| 54 | data memory |
| 56 | memory card |
| 58 | card interface |
| 59 | card connector |
| 60 | host computer interface |
| 62 | microprocessor |
| 64 | user inputs |
| 66 | flash unit |
| 68 | timing generator |
| 70 | photodiode |
| 72 | exposure driver |
| 74 | sensor drive |
| 76 | calibration memory |
| 80 | optical assembly |
| 82 | EEPROM |
| 84 | electrical connecting means |
| 86 | metering control circuit |
| 88 | exposure program table |
| 90 | exposure correction section |

We claim:

1. A camera comprising:

an aperture mechanism providing two or more aperture sizes for regulation of the intensity of image light gathered by the camera;

a storage device for storing aperture calibration data corresponding to the measured transmissivity of each aperture size;

means for controlling camera exposure according to the value of one or more exposure parameters other than the aperture; and an exposure circuit that utilizes the stored aperture calibration data in order to establish the value of at least one of the exposure parameters.

2. A camera as claimed in claim 1 wherein the camera includes a shutter, said one or more exposure parameters includes a shutter time, and said exposure circuit utilizes the stored aperture calibration data to establish the value of the shutter time.

3. A camera as claimed in claim 1 wherein the aperture calibration data is stored as offsets from nominal aperture data.

4. A camera as claimed in claim 1 wherein the aperture mechanism comprises one or more aperture blades which are movable from either of two directions to define said two or more aperture sizes.

5. A camera as claimed in claim 4 wherein the aperture calibration data is stored as directional offsets from nominal aperture data.

6. A camera as claimed in claim 1 wherein the camera includes a quenchable flash, and the exposure circuit utilizes the stored aperture calibration data to establish the quench time for the flash.

7. A camera comprising:

a light sensitive receptor;

an optical section for focusing image light upon the receptor, said optical section including a mechanically-controlled aperture mechanism providing two or more aperture sizes for regulation of the intensity of the image light;

a storage device for storing aperture calibration data corresponding to the measured transmissivity of each aperture size, said measured transmissivity including deviation from a nominal transmissivity for each aperture due to mechanical anomalies of the aperture mechanism;

means for controlling image exposure according to the value of one or more exposure parameters other than the aperture; and an exposure circuit that utilizes the stored aperture calibration data in order to establish the value of at least one of the exposure parameters.

8. A camera as claimed in claim 7 wherein the camera includes a shutter, said one or more exposure parameters includes a shutter time, and said exposure circuit utilizes the stored aperture calibration data to establish the value of the shutter time.

9. A camera as claimed in claim 7 wherein the light sensitive receptor is photographic film.

10. A camera as claimed in claim 7 wherein the light sensitive receptor is an electronic sensor.

11. A camera as claimed in claim 10 wherein the camera includes a processing circuit for processing a signal from the electronic sensor, said one or more exposure parameters includes a signal gain for the processing circuit, and said exposure circuit utilizes the stored aperture calibration data to establish the value of the signal gain.

12. A camera as claimed in claim 7 wherein the aperture calibration data is stored as offsets from nominal aperture data.

13. A camera as claimed in claim 7 wherein the aperture mechanism comprises a plurality of aperture blades which are movable from either of two directions to define said two or more aperture sizes.

14. A camera as claimed in claim 13 wherein the aperture calibration data is stored as directional offsets from nominal aperture data.

15. A camera as claimed in claim 7 wherein the camera includes a quenchable flash, and the exposure circuit utilizes the stored aperture calibration data to establish the quench time for the flash.

16. A camera as claimed in claim 7 wherein the light sensitive receptor, the optical section, and the storage device are included in a subassembly that is removable from the camera.

17. A method for controlling the exposure of a camera according to the value of one or more exposure parameters, said method comprising the steps of:

focusing image light upon a light sensitive receptor through an optical section, said optical section including a mechanically-controlled aperture mechanism providing two or more aperture sizes for regulation of the intensity of the image light;

storing aperture calibration data corresponding to the measured transmissivity of each aperture size, said measured transmissivity including deviation from a nominal transmissivity for each aperture due to mechanical anomalies of the aperture mechanism;

utilizing the stored aperture calibration data in order to establish the value of at least one of exposure parameters other than the aperture; and controlling image exposure according to the value of said at least one exposure parameters.

18. A method for capturing an image of a scene, said method comprising the steps of:

evaluating image light to determine a light level of the scene;

determining a designated aperture value for the evaluated light level;

retrieving a stored calibration value representative of a transmittance variation for the designated aperture value;

establishing a value of at least one exposure parameter other than the aperture value based at least in part on the retrieved calibration value; and using the designated aperture value and said at least one exposure parameter to capture an image of the image.

* * * * *